United States Patent
Sharma et al.

(10) Patent No.: US 10,708,443 B2
(45) Date of Patent: *Jul. 7, 2020

(54) TOLL-FREE TELECOMMUNICATIONS MANAGEMENT PLATFORM

(71) Applicant: Somos, Inc., Bridgewater, NJ (US)

(72) Inventors: Sriram Sharma, Herndon, VA (US); William Carter, Potomac Falls, VA (US); Michael Kimmel, Ashburn, VA (US)

(73) Assignee: Somos, Inc., East Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,604

(22) Filed: Mar. 22, 2019

(65) Prior Publication Data

US 2020/0021690 A1 Jan. 16, 2020

Related U.S. Application Data

(63) Continuation of application No. 15/720,909, filed on Sep. 29, 2017, now Pat. No. 10,306,075, which is a
(Continued)

(51) Int. Cl.
*H04M 3/00* (2006.01)
*H04M 5/00* (2006.01)
(Continued)

(52) U.S. Cl.
CPC .......... *H04M 15/83* (2013.01); *H04M 3/493* (2013.01); *H04M 3/5232* (2013.01);
(Continued)

(58) Field of Classification Search
CPC .. H04M 3/436; H04M 3/493; H04M 15/8033; H04M 3/523
(Continued)

(56) References Cited

U.S. PATENT DOCUMENTS 5,528,672 A 6/1996 Wert et al.
5,586,175 A 12/1996 Hogan et al.
(Continued)

FOREIGN PATENT DOCUMENTS

CA 2965681 A1 5/2016
CA 2959916 A1 4/2018
(Continued)

OTHER PUBLICATIONS

U.S. Appl. No. 16/675,285, filed Nov 6, 2019, Pending, Sharma.
(Continued)

*Primary Examiner* — Thjuan K Addy
(74) *Attorney, Agent, or Firm* — GTC Law Group PC & Affiliates

(57) ABSTRACT

Methods and systems are provided for the management, routing and reporting of toll-free telecommunications calls and data. Methods and systems are provided for pre-populating a call routing template based on natural language inputs and populating telecommunications routing codes at nodes of a call routing decision tree to generate a call routing template that may be identified and presented to a user interface based at least in part on a natural language input.

20 Claims, 3 Drawing Sheets

Related U.S. Application Data continuation of application No. 15/373,387, filed on Dec. 8, 2016, now Pat. No. 9,807,251, which is a continuation of application No. 14/928,575, filed on Oct. 30, 2015, now Pat. No. 9,549,066.

(60) Provisional application No. 62/073,976, filed on Nov. 1, 2014.

(51) Int. Cl.
  *H04M 15/00* (2006.01)
  *H04M 3/493* (2006.01)
  *H04M 3/523* (2006.01)

(52) U.S. Cl.
  CPC ........ *H04M 15/59* (2013.01); *H04M 2201/40* (2013.01); *H04M 2203/251* (2013.01); *H04M 2203/258* (2013.01)

(58) Field of Classification Search
  USPC ............ 379/265.02, 220.01, 201.01, 221.02, 379/221.01, 272, 273, 219
  See application file for complete search history.

(56) References Cited

U.S. PATENT DOCUMENTS

| | | | |
|---|---|---|---|
| 6,115,462 A | 9/2000 | Servi et al. | |
| 6,173,279 B1 | 1/2001 | Levin et al. | |
| 6,236,851 B1 | 5/2001 | Fougnies et al. | |
| 6,393,283 B1 | 5/2002 | Morgan | |
| 6,473,500 B1 | 10/2002 | Risafi et al. | |
| 6,574,661 B1 | 6/2003 | Delano et al. | |
| 6,654,451 B1 | 11/2003 | Ward et al. | |
| 6,763,376 B1 | 7/2004 | Devine et al. | |
| 7,092,888 B1 | 8/2006 | McCarthy et al. | |
| 7,099,453 B2* | 8/2006 | Crockett ............... | H04M 3/436 379/216.01 |
| 7,225,249 B1 | 5/2007 | Barry et al. | |
| 7,298,833 B2 | 11/2007 | Klein et al. | |
| 7,542,553 B2* | 6/2009 | Gurfein ................ | H04M 3/493 379/88.04 |
| 7,643,627 B2 | 1/2010 | Starling et al. | |
| 8,379,531 B2 | 2/2013 | Farris et al. | |
| 8,401,161 B2 | 3/2013 | Terpstra et al. | |
| 8,619,961 B2 | 12/2013 | Starling et al. | |
| 9,531,886 B2 | 12/2016 | Wong et al. | |
| 9,549,066 B2 | 1/2017 | Sharma et al. | |
| 9,553,997 B2 | 1/2017 | Sharma et al. | |
| 9,571,666 B2 | 2/2017 | Sharma | |
| 9,571,667 B2 | 2/2017 | Kimmel | |
| 9,635,191 B2 | 4/2017 | Sharma et al. | |
| 9,654,648 B2 | 5/2017 | Sharma | |
| 9,654,649 B2 | 5/2017 | Sharma | |
| 9,716,799 B2 | 7/2017 | Sharma | |
| 9,800,742 B2 | 10/2017 | Sharma | |
| 9,807,251 B2 | 10/2017 | Sharma et al. | |
| 9,930,189 B2 | 3/2018 | Chauhan | |
| 9,992,352 B2 | 6/2018 | Sharma et al. | |
| 10,097,698 B2 | 10/2018 | Sharma et al. | |
| 10,165,128 B2 | 12/2018 | Sharma | |
| 10,306,075 B2 | 5/2019 | Sharma et al. | |
| 10,382,631 B2 | 8/2019 | Sharma et al. | |
| 10,477,033 B2 | 11/2019 | Chauhan | |
| 10,560,583 B2 | 2/2020 | Sharma | |
| 2002/0186825 A1 | 12/2002 | Marchand et al. | |
| 2003/0048889 A1 | 3/2003 | Marchead et al. | |
| 2004/0213392 A1 | 10/2004 | Crockett et al. | |
| 2005/0058270 A1* | 3/2005 | Allen .................. | H04Q 3/0045 379/220.01 |
| 2006/0115061 A1 | 6/2006 | Wilson et al. | |
| 2011/0249666 A1 | 10/2011 | Holbrook et al. | |
| 2012/0030293 A1 | 2/2012 | Bobotek | |
| 2012/0288078 A1 | 11/2012 | Starling et al. | |
| 2013/0094640 A1 | 4/2013 | McClure et al. | |
| 2013/0151314 A1 | 6/2013 | Kugler et al. | |
| 2013/0177142 A1 | 7/2013 | Allen et al. | |
| 2013/0195102 A1 | 8/2013 | Kyle | |
| 2014/0006218 A1 | 1/2014 | Muthu | |
| 2014/0307730 A1 | 10/2014 | Friedman et al. | |
| 2016/0127539 A1 | 5/2016 | Sharma | |
| 2016/0127540 A1 | 5/2016 | Sharma et al. | |
| 2016/0127541 A1 | 5/2016 | Sharma | |
| 2016/0127548 A1 | 5/2016 | Sharma | |
| 2016/0127549 A1 | 5/2016 | Sharma | |
| 2016/0127552 A1 | 5/2016 | Sharma et al. | |
| 2016/0127562 A1 | 5/2016 | Chauhan | |
| 2016/0127566 A1 | 5/2016 | Sharma et al. | |
| 2016/0127567 A1 | 5/2016 | Kimmel | |
| 2016/0127569 A1 | 5/2016 | Karnas et al. | |
| 2016/0127808 A1 | 5/2016 | Wong et al. | |
| 2016/0191716 A1 | 6/2016 | Sharma | |
| 2017/0085724 A1 | 3/2017 | Sharma et al. | |
| 2017/0094066 A1 | 3/2017 | Sharma et al. | |
| 2017/0180567 A1 | 6/2017 | Sharma et al. | |
| 2018/0027129 A1 | 1/2018 | Sharma | |
| 2018/0249016 A1 | 8/2018 | Sharma et al. | |
| 2019/0028595 A1 | 1/2019 | Chauhan | |
| 2019/0089844 A1 | 3/2019 | Sharma et al. | |
| 2019/0312979 A1 | 10/2019 | Sharma | |
| 2020/0028974 A1 | 1/2020 | Chauhan | |
| 2020/0053204 A1 | 2/2020 | Karnas et al. | |

FOREIGN PATENT DOCUMENTS

| | | |
|---|---|---|
| WO | 2000059197 A1 | 10/2000 |
| WO | 2016070095 A1 | 5/2016 |
| WO | 2016090338 A1 | 6/2016 |
| WO | 2016090338 A9 | 3/2017 |

OTHER PUBLICATIONS

U.S. Appl. No. 16/523,268, filed Jul. 26, 2019, Pending, Sharma et al.

U.S. Appl. No. 16/108,409, filed Aug 22, 2018, Abandoned, Sharma et al.

PCT/US2015/058401, "International Application Serial No. PCT/US2015/058401 International Search Report and Written Opinion dated Feb. 17, 2016", SMS/800, Inc., 5 pages.

PCT/US2015/058401, "International Application Serial No. PCT/US2015/058401, International Preliminary Report on Patentability and Written Opinion dated May 11, 2017", Somos, Inc., 7 Pages.

PCT/US2015/064135, "International Application Serial No. PCT/US2015/064135, International Preliminary Report on Patentability and Written Opinion dated Jun. 15, 2017", Somos, Inc., 12 Pages.

PCT/US2015/064135, "International Application Serial No. PCT/US2015/064135, International Search Report and Written Opinion dated Mar. 31, 2016", Somos, Inc., 15 pages.

* cited by examiner

TOLL-FREE TELECOMMUNICATIONS MANAGEMENT PLATFORM

RELATED APPLICATION

This application is a continuation of U.S. application Ser. No. 15/720,909, filed Sep. 29, 2017, which is a continuation of U.S. application Ser. No. 15/373,387, filed Dec. 8, 2016, now U.S. Pat. No. 9,807,251, issued Oct. 31, 2017, which is a continuation of U.S. application Ser. No. 14/928,575, filed Oct. 30, 2015, now U.S. Pat. No. 9,549,066, issued Jan. 17, 2017, which claims priority to U.S. Application Ser. No. 62/073,976, filed Nov. 1, 2014.

The above applications are hereby incorporated by reference in their entirety.

FIELD OF INVENTION

This disclosure is related to the operation, control and management of toll-free telecommunication lines.

BACKGROUND

Businesses increasingly use toll-free telephone numbers for providing customers with a convenient and cost-free means of communicating with them and their various departments, such as customer service and technical support representatives. With the proliferation of toll-free numbers and advanced business analytics for receiving, routing, and logging, the use of such numbers has come increased complexity in managing toll-free numbers.

SUMMARY

Provided herein are methods and systems for pre-populating a call routing template based on natural language inputs comprising, associating a natural language element with a telecommunications routing code, the telecommunications routing code associated with decision tree logic associating routing of incoming calls to a toll-free telecommunications number; storing the association; receiving a natural language input from a user, the natural language input includes the natural language element; selecting the telecommunications routing code based at least in part on the stored association; populating the telecommunications routing code at a node of a call routing decision tree to generate a populated call routing decision tree; and storing the populated call routing decision tree as a call routing template that may be identified and presented to a user interface based at least in part on the natural language input.

In embodiments, a natural language input may be a text or voice element. A text element may be a scanned text element. A voice element may be obtained by voice recognition software.

In embodiments, decision tree logic may determine the call path taken by an incoming toll-free call to a termination number, the call path taken by an incoming toll-free call based at least in part on the time of day the incoming call is received, the call path taken by an incoming toll-free call based at least in part on the geographic location of the device from which the incoming call is received, the call path taken by an incoming toll-free call within a business entities telecommunications system, or some other call path outcome.

Further provided herein are methods and systems for creating a call routing decision tree, the system comprising a user device of a user configured to receive a natural language input from a user; select a stored call routing template, wherein the selection is based at least in part on a stored association of the call routing template and a natural language element that is included in the natural language input; present the stored call routing template to the user within a graphic user interface; receive a command from the user, through the graphic user interface, to associate the selected call routing template with a toll-free telecommunications number indicated by the user; and store the association between the call routing template and the toll-free telecommunications number.

In embodiments, the command from the user may be text-based, such as a text-based item that is presented within the graphic user interface in a menu or other location. In embodiments, the command may be a voice command.

Further provided herein are methods and systems of a user device for presenting data to a user in real time regarding changes in metadata associated with a toll-free telecommunications number, the user device comprising a user device of a user configured to receive an indication of a change in status of a toll-free communications number, wherein the telecommunications number is associated with a responsible organization that processes toll-free telecommunications; update a metadatum associated with the toll-free communications number based at least in part on the change in status; store the metadatum; receive a status request from a user relating to the responsible organization; and present the user with a graphic representation of the telecommunications number's status. In embodiments, the presentation may include presenting a status for a plurality of telecommunication numbers associated with the responsible organization, wherein the status presented is based on real time status changes occurring over a toll-free telecommunications network.

Further provided herein are methods and systems of toll-free telecommunications data visualization comprising presenting a data visualization dashboard to a mobile application on a client device, wherein the presentation includes a selectable listing of toll-free telecommunications data parameters; receiving a selection from the client device of the toll-free telecommunications data parameters to analyze and at least one type of data analysis to perform; retrieving, in substantially real time, data relating to the selected toll-free telecommunications data parameters; analyzing the data according to the at least one type of data analysis; and presenting to the mobile application a summary of an analytic result.

In embodiments, the status may indicate availability of the toll-free telecommunications number for purchase, that the toll-free telecommunications number has been reserved, historical usage information relating to the toll-free telecommunications number, a billing action required for the toll-free telecommunications number, an upcoming availability of the toll-free telecommunications number, or some other status information associated with the toll-free telecommunications number.

BRIEF DESCRIPTION OF THE FIGURES

Various features will become apparent to those skilled in the art from the following detailed description of the disclosed non-limiting embodiments. The drawings that accompany the detailed description can be briefly described as follows.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the methods and systems disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

The present disclosure includes a toll-free management platform (TFMP) for providing services to toll free subscribers and providers, enabling them to manage a plurality of toll-free numbers and tasks associated with such numbers. Functionalities of the TFMP include, but are not limited to, Number Administration (NA) and Customer Record (CR) administration.

Figure 1:
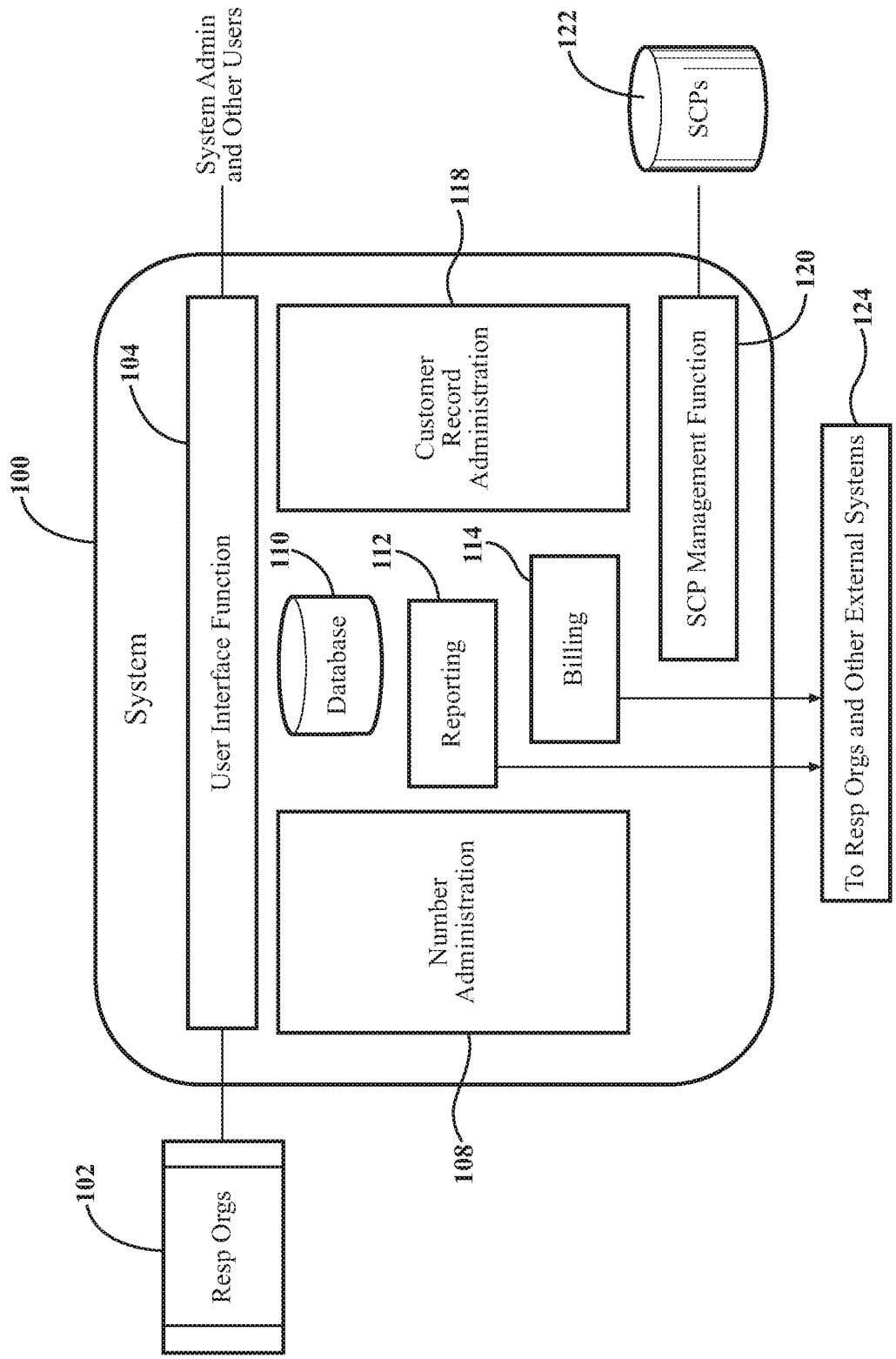
FIG. 1 depicts a simplified illustration of the toll-free management platform.

FIG. 1 depicts the main functional components of the TFMP 100, illustrating examples of the functionality provided by the TFMP and interfaces 104 to the TFMP. The NA functionality 108 may allow toll-free providers to search a pool of toll-free numbers using specified criteria and reserve numbers that will be used by toll-free subscribers, and perform CR administration 118. This functionality may include, but is not limited to, storing toll-free provider and telecommunications data 110, reporting processes 112, billing, [and service control point (SCP), and management functionality 120 for the coordination with SCPs 122. Responsible organizations, also referred to herein as "RespOrgs," 102, may utilize the TFMP 100. Reporting from the TFMP 100 may be back to RespOrgs or to other systems and platforms 124 that are external to the TFMP 100. The TFMP enables searching for any random number or to search for a plurality of numbers that are consecutive and/or include an indicated combination of digits. Since certain toll-free number codes (e.g. 800) and combinations of digits (e.g. repeating digits, digits whose corresponding telephone keypad letter values spell a word or phrase) may be considered most desirable, the NA function 108 includes capabilities for searches and reservations to be handled so that a toll-free provider does not gain an advantage to reserve a given toll-free number. The TFMP also enables tracking the overall assignment of numbers for each toll-free provider in order to enforce regulations for toll-free number allocation specified by the tariff. NA may maintain a status for each number that reflects whether it has been reserved and whether a customer record has been created and sent to SCPs. It is possible to query the TFMP 100 for status and reservation information associated with a number.

The TFMP enables customer record administration, allowing toll-free providers to create a customer record and to specify when the information should be sent to SCPs. A reserved toll-free number may become active when routing information for the number, specified in a customer record, is uploaded into SCPs. Customer records may be updated or deleted and the send time updated prior to sending. Once a customer record has been sent, a new record may be created to update or delete the routing specified by the previous record. The routing information specified in a customer record may include, but is not limited to:

- An Area of Service (AOS) that specifies from where the toll-free number can receive calls
- The carrier that will route calls to the toll-free number
- The terminating number that will receive calls to the toll-free number
- A set of rules that specifies different routing based on criteria like time of day and area from where the call originated Carriers who have arrangements to carry calls for a toll-free provider may wish to approve customer records when routing for a toll-free number has been assigned to the carrier. The customer record function may maintain a list of carriers and preferences for whether approval is required when a toll-free provider indicates the carrier in a customer record. A notification may be sent to a carrier when approval of a customer record is required. In embodiments, each customer record may have an associated status. Customer records may be queried to view the status and information contained in the record, based on the permissions of the user.

In another disclosed non-limiting embodiment, the TFMP may include a user interface functionality that allows manual access for human users and mechanized access for systems (such as an application programming interface) to make use of the NA and CR functions provided by the TFMP. Such systems may be embodied in a distributed computing environment, such as a "cloud" based computing network. In another embodiment, such systems may be hybrid networks, including usage of a cellular telephone network (and associated mobile communication devices, such as smart phones), a distributed, cloud network and an enterprise network associated with a carrier or other business organization (and any combination or sub-combination of such networks). The mechanized interface provided by the TFMP may allow external users to establish data dynamic connectivity with the platform and gain access to its available functions. The TFMP may maintain logins, passwords, encryption, authentication, and the like to provide security to limit system access to only authorized users. Permission levels that restrict access to TFMP's functions and to proprietary data may be assigned for each authorized user, and stored locally or remotely to an enterprise utilizing the TFMP, including within a computing storage facility that is remote to, but operatively coupled, with the TFMP. In embodiments, the user interface functionality may provide real time notifications and other information to external users using mechanisms such as email and File Transfer Protocol (FTP).

In another disclosed non-limiting embodiment, the TFMP may provide an interface to send routing information from CRs to SCPs. The SCP Management Function of the TFMP may enable management of interactions with SCPs, including maintaining data connectivity, sending CR information at the specified date and time, and monitoring responses in order to update customer record status. The SCP interface may include an interface that is based on the specification provided by TM-ST S-00798, *CMSDB/SMS Interface Specification Manual and Interface Message Manual.*

In another disclosed non-limiting embodiment, the SCP administration functions of the TFMP may allow users to establish and modify SCP-related reference data in the system and send messages to the SCP node and the Call Management Services Data Base (CMSDB) within the SCP to manage data tables at the SCP. Network management functions for toll-free database services may involve the management of various automatic capabilities intended to monitor and control toll-free query traffic and calling volumes at the SCPs, Service Switching Points, terminating switches, terminating subscriber lines, and the like. When various call volume thresholds are exceeded, the SCPs may trigger Automatic Code Gapping (ACG) controls at the originating SSPs. The TFMP's management functions may allow network managers to configure and adjust relevant control parameters. Data collection at the SCPs may be requested through the TFMP to provide network managers with surveillance information that is useful to monitor traffic and analyze problems, such as the detection of SCP overloads and excessive calling or excessive ineffective attempts to dialed codes.

In another disclosed non-limiting embodiment, the TFMP may enable reporting functionalities that allow tracking user actions, system events, performance statistics, and other events and formatting the information into reports for toll-free providers and system administrators. The TFMP may provide capabilities for users to request reports and for delivery of report results in a plurality of formats. Reports may be requested online by users as per the assigned permissions and delivered over the interface on which the report was requested. Requests may be made from any computing facility, including, but not limited to, a personal computer, laptop computer, tablet, mobile communication facility (such as a smart phone), or some other type of computing device. It may also be possible for users to request reports off-line using the TFMP. For example, a system administrator using information provided by the platform may dynamically compile off-line reports. In embodiments, the TFMP may track and report on real time events that will result in charges to toll-free providers. The tariff specifies the rate elements that may result in charges on a monthly bill and the rate to be charged. These may include, but are not limited by, establishment of a system logon ID, monthly access to the system, reservation of a toll-free number, report requests, or some other type of element. Information provided by the TFMP may be needed to calculate monthly charges and create monthly bills that are sent to each toll-free provider.

The current practice of managing toll-free numbers and activities, and the tools currently available to users for building a complex customer record, are very often single threaded and cumbersome. In addition, the current industry practices do not provide the ability to define a default customer record for a user, in part because it may not be intuitive to build a complex customer record. According to the methods and systems presently disclosed, the TFMP may provide tools that work intelligently with the user, allowing a natural language input, such as English words, to translate and map such language to signifiers that may be less familiar to a user, such as call routing codes. This translation and mapping of natural language to toll-free number management information and data may produce a dynamic, complex customer record, including using existing user records and usage data, to populate information for the user. This may speed the creation of complex routing and other metadata that is associated with a toll-free line, based at least in part on the TFMP enabling the dynamic querying of the real time status of data that is associated with a toll-free number, guide the user in providing the necessary natural language information that allows the TFMP to map such language to toll-free number metadata (e.g., routing codes), and store and implement a complex decision tree describing the actions to take for a given toll-free number.

In an example, the TFMP may provide a user interface in which a user types a command such as "Route all incoming calls made to toll-free numbers having the extension 571 to the technical support staff." The TFMP may take this natural language input and map it to routing codes or other data corresponding to the natural language. In another example, the natural language may be selected from a menu that is provided in the user interface of the TFMP, provided via voice command using voice recognition software, via scanned text that is input to the TFMP, or using some other means of conveying natural language. The Customer Record Template Builder (CRTB) of the TFMP may allow building a complex customer record template using a user interface, enabling that record to be designated as the default customer record. Using the TFMP, a toll-free provider may build multiple complex customer record templates for their use and define a record as the default customer record, allowing the user to select the default with a single click, thus reducing their work effort.

In another disclosed non-limiting embodiment, the CRTB may lead a user through an initial customer data population (known as the Customer Administrative Data (CAD) portion), and also the call routing logic (Call Processing Record; known as the CPR portion) that is associated with a toll-free number, by utilizing the TFMP user interface to construct a decision tree logic structure with defined data nodes derived from the user's natural language inputs.

Figure 2:
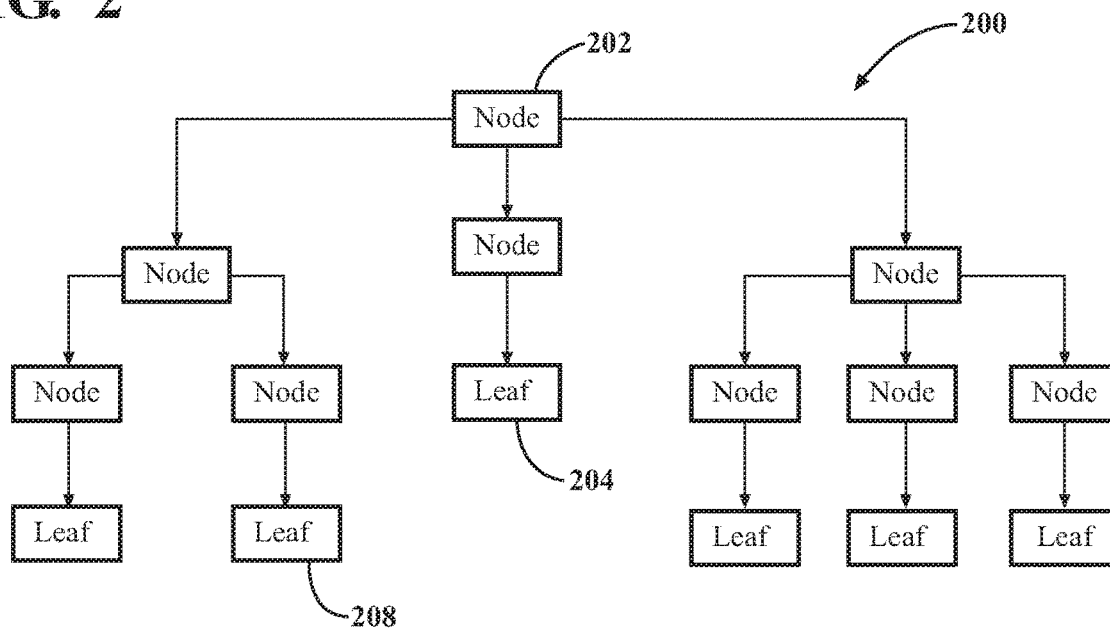
FIG. 2 is a schematic illustration of a basic decision tree structure.

Based upon the decisions at the nodes in the decision tree that is constructed by the TFMP, the user interface may drive down a branch to a new decision node ultimately driving the customer record decision logic to the lowest level. In embodiments, decision trees constructed by the TFMP based on a user's input may represent a series of decision points. Each decision point may be called a node and off of each node may be one of more branches. The point at which there are no more decisions to be made may be referred to as a leaf and used as the "end point" of a branching structure. FIG. 2 illustrates an example generic visualization of one possible decision tree structure 200 created by the TFMP 100. For example, a call to a particular toll-free number may initially have a node 202 based on the area code from which the toll-free number is called, to segregate an east coast or west-coast technical support staff. Then, the next node may be a time node to segregate the time of day between business hours where the call is routed to the technical support staff, or after business hours where the call is routed to a voice-mail system. The decision tree may further branch into "leaves" 204, 208 to indicate additional routing rules, such as specifying a single termination number for a received call to be routed to, a particular department within an organization, or some other routing tree rule. The TFMP performs such routing essentially instantaneously or near instantaneously.

In another disclosed non-limiting embodiment, the CAD portion of the CRTB may logically lead a user to populate information including, but not limited to, the following:

Administrative data about the toll-free customer
  Toll-Free Number
  Effective Date and Time Control Toll Free Provider Identifier
End Customer Name
End Customer Address
Area of Service (AOS),
List of destination telephone number(s)
Carrier Identification Codes (CICs) for IntraLATA and InterLATA traffic In another disclosed non-limiting embodiment, complex customer record (CPR) decision nodes that may be supported by the TFMP include, but are not limited to, the following:
Originating State
Originating Numbering Plan Area (NPA)
Originating LATA
Originating Plain Old Telephone System (POTS) Central Office Exchange (NXX)
Originating POTS NPANXX
Originating POTS number
Specific date
Day(s) of the week
Time-of-day range
Percent load share, which may be used to automatically direct different percentages of processed queries (calls) to different branches below the node.

In another disclosed non-limiting embodiment, the "leaves" that may be supported by the TFMP data model at the ends of a given branch include, but are not limited to, the following:
Destination Telephone Number
Carrier
Announcement Treatment Referring to FIG. 3, a simplified depiction of a customer record routing, created using the TFMP, is provided. In this simple example, starting from the left-most branched path, the three decision paths corresponding to the decision trees branched paths may be represented as a routing from a toll-free number 300, detecting an area code 302, an exchange 304, carrier 308, and terminating telephone number 310, as in the following example:
1. Area Code=732, NXX={699,494}, Carrier=ATX-0288, Tel #=800-234-5678
2. Area Code=732, NXX=Other, Carrier=MCI-0222, Tel #=800-234-5678
3. Area Code=Other, NXX=<null>, Carrier=MCI-0222, Tel #=800-234-5678.

Figure 3:
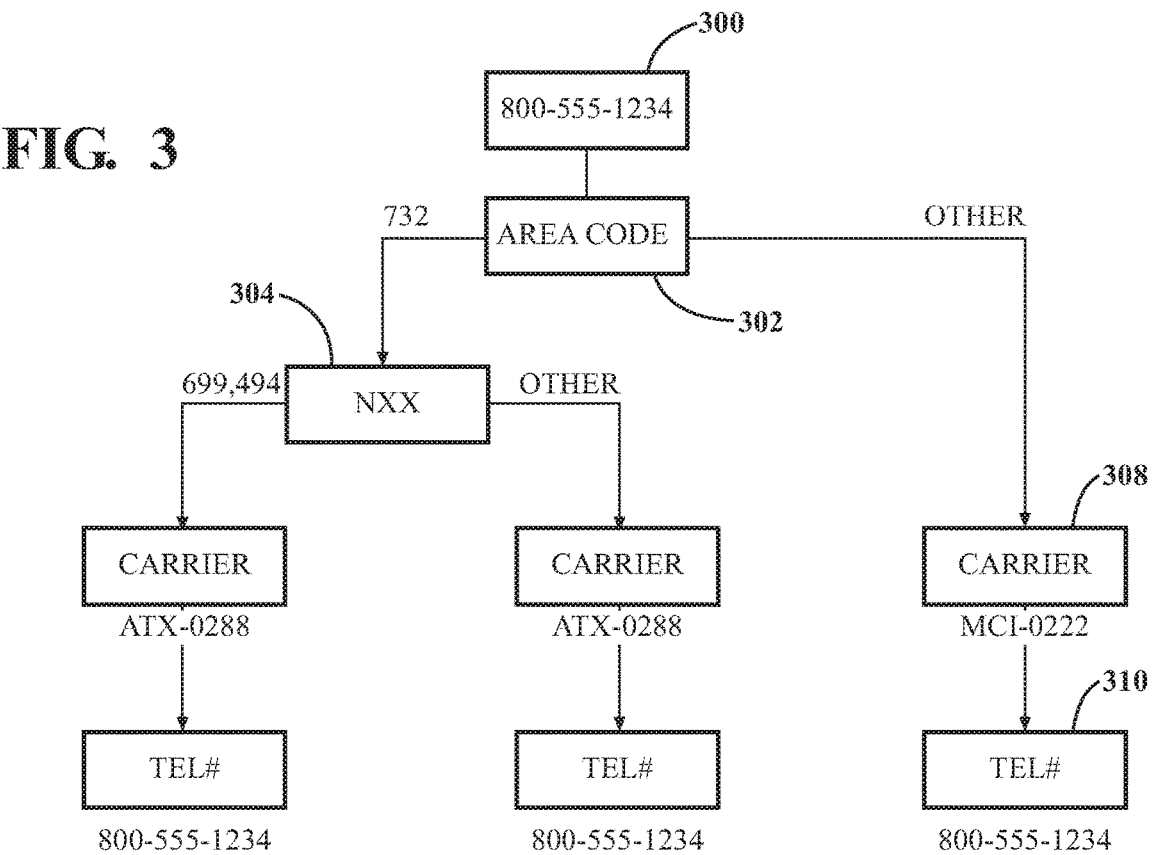
FIG. 3 illustrates a simplified customer record routing, created using the toll-free management platform.

Continuing the example of FIG. 3, using the TFMP, the CRTB toll may be built in such a manner to allow a user to work though the decision tree and anticipate/prepopulate information based upon the information already provided in this build or also information provided in previous customer record entries. Once a default customer record template is built, the TFMP may invoke this template when creating a customer record for a new number, thus reducing the time and effort for a subsequent customer record to be built. Invocation of the default customer record template by the TFMP may also serve to reduce human error associated with the manual creation of such records insofar as the template may already embody necessary data, thereby not requiring a user to remember or retrieve the same.

Figure 4:
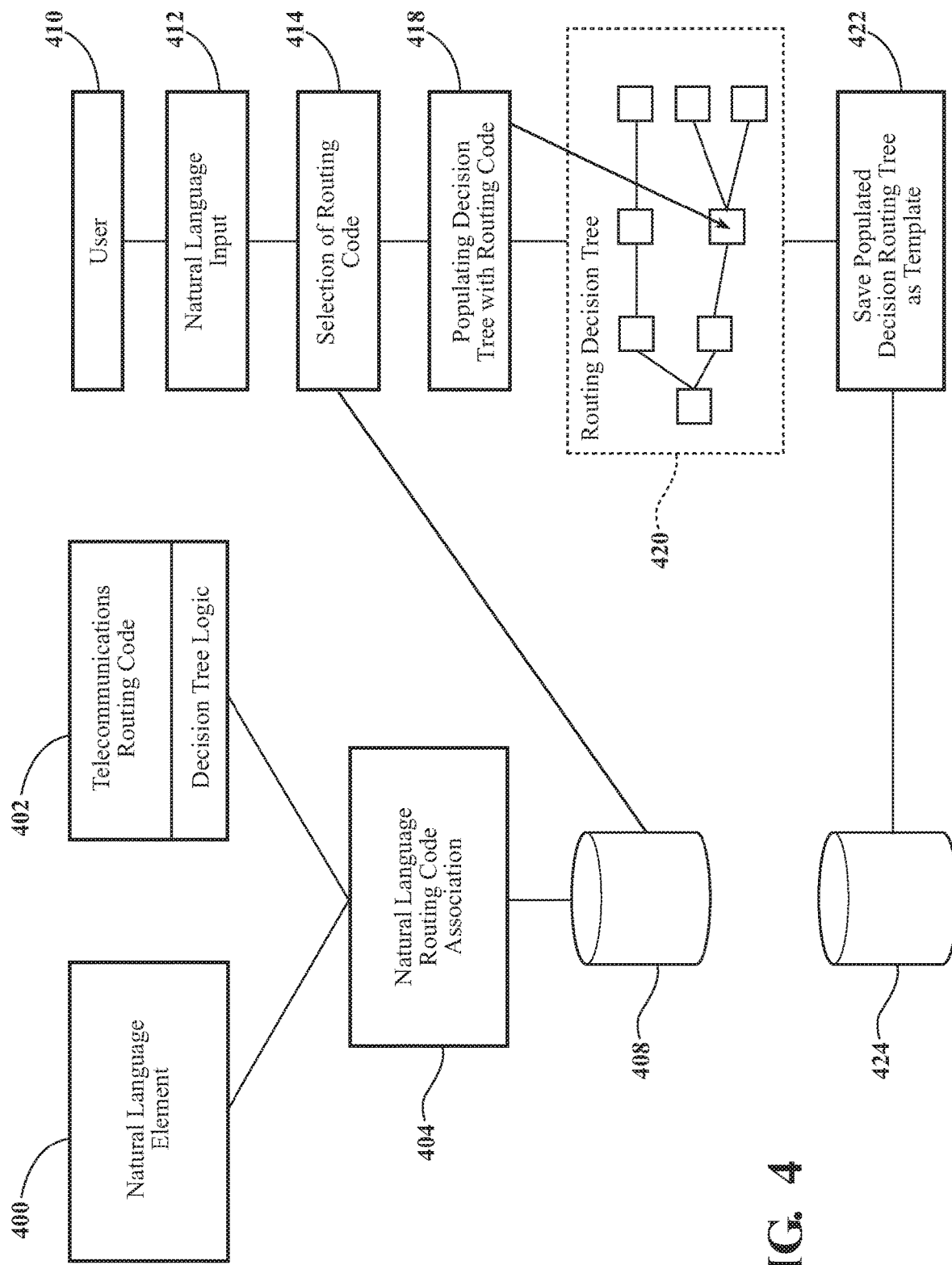
FIG. 4 depicts a simplified flow diagram for constructing a call routing template based at least part on natural language inputs from a user.

Referring to FIG. 4, the methods and systems of the present disclosure may provide for pre-populating a call routing template based on natural language inputs including, associating a natural language element 400 with a telecommunications routing code 402, the telecommunications routing code associated with decision tree logic associating routing of incoming calls to a toll-free telecommunications number 404; storing the association in a database 408 that is associated with a toll-free telecommunications system; receiving a natural language input 412 from a user 410, the natural language input 412 may include the natural language element 400; selecting the telecommunications routing code 414 based at least in part on the stored association 404; populating the telecommunications routing code 418 at a node of a call routing decision tree 420 to generate a populated call routing decision tree 422; and storing the populated call routing decision tree as a call routing template 424 that may be identified and presented to a user interface based at least in part on the natural language input.

In embodiments, a natural language input may be a text or voice element. A text element may be a scanned text element. A voice element may be obtained by voice recognition software.

In embodiments, decision tree logic may determine the call path taken by an incoming toll-free call to a termination number, the call path taken by an incoming toll-free call based at least in part on the time of day the incoming call is received, the call path taken by an incoming toll-free call based at least in part on the geographic location of the device from which the incoming call is received, the call path taken by an incoming toll-free call within a business entities telecommunications system, or some other call path outcome.

Further provided herein are methods and systems for creating a call routing decision tree, the system comprising a user device of a user configured to receive a natural language input from a user; select a stored call routing template, wherein the selection is based at least in part on a stored association of the call routing template and a natural language element that is included in the natural language input; present the stored call routing template to the user within a graphic user interface; receive a command from the user, through the graphic user interface, to associate the selected call routing template with a toll-free telecommunications number indicated by the user; and store the association between the call routing template and the toll-free telecommunications number.

In embodiments, the command from the user may be text-based, such as a text-based item that is presented within the graphic user interface in a menu or other location. In embodiments, the command may be a voice command.

The following are illustrative clauses demonstrating non-limiting embodiments of the inventions described herein:

A method of pre-populating a call routing template based on natural language inputs comprising:
associating a natural language element with a telecommunications routing code, the telecommunications routing code associated with decision tree logic associating routing of incoming calls to a toll-free telecommunications number;
storing the association;
receiving a natural language input from a user, wherein the natural language input includes the natural language element;
selecting the telecommunications routing code based at least in part on the stored association;
populating the telecommunications routing code at a node of a call routing decision tree to generate a populated call routing decision tree;
storing the populated call routing decision tree as a call routing template that may be identified and presented to a user interface based at least in part on the natural language input.

A system for creating a call routing decision tree, the system comprising:

a user device of a user configured to:
receive a natural language input from a user;
select a stored call routing template, wherein the selection is based at least in part on a stored association of the call routing template and a natural language element that is included in the natural language input;
present the stored call routing template to the user within a graphic user interface;
receive a command from the user, through the graphic user interface, to associate the selected call routing template with a toll-free telecommunications number indicated by the user; and
store the association between the call routing template and the toll-free telecommunications number.

In the current industry practice, updates and additions to toll-free providers numbers are not available through conventional platform reporting capabilities for up to 24 hours. This makes it difficult for end users to call up information about work done on the current day. If a toll-free number is reserved and for whatever reason the user does not record the actual number, there is often no way to find it, or a laborious search is required to assemble the necessary data elements for retrieval. One reason for the delay in the ability to report is that reporting is sourced from a Report History Data Base (RHDB) that is only populated with updates once a day. Additionally, most reporting from the RHDB is run in the background, thus in some cases, still further delaying the response.

In another disclosed non-limiting embodiment, the TFMP provides the user the ability to report on its number portfolio in real time or near real time via an online customer dashboard. The online customer dashboard may display simulated gauges and dials, business graphics such as pie charts, bar charts and graphs to provide overview that summarizes all pertinent data in one or two screens or views. The gauges and dials may be based upon real time data that is stored within the TFMP.

The online customer dashboard may allow the user to see all its customer data and drill down in the details in near real time. To do so, a data source for the dashboard may maintain the data in real time or near real time.

The online customer dashboard may provide the user with a view into the user portfolio of toll-free number information. This may allow a user to see basic number information about the toll-free numbers the user has the authority to view.

The online customer dashboard may initially provide a main dashboard screen from which the user may drill down within a specific toll-free number to investigate more detailed information thereof. In one example, the main dashboard screen may provide a base set, or minimum list of data elements that are available, including, but not limited to, the following:
User Information
  Toll Free Provider
  User Id
  Last Login
  Amount of numbers reserved
Number Information (a list of all toll free numbers associated with this provider)
  Toll Free Number
  Number Status
  Date Reserved
  Date Last Updated
  Customer Name The user can then drill down into the particular toll free number by clicking on that particular number to find more detailed information such as, Area of Service, Carrier(s), Call Routing, Reserve numbers, or other information associated with a toll-free number.

A user may also view the history of the number i.e. "the life of a toll-free number." By selecting a particular toll free number, the history of use of the toll free number may be readily viewable. Various charts, timelines, and usage data may be included therein. This functionality may allow a user to view and report on the status and activities of an entire RespOrg in real time, rather than parts of a RespOrg's activity and/or only at predefined time intervals (e.g., once per day).

In another disclosed non-limiting embodiment, the online customer dashboard is not a view only tool, but may provide additional or alternative features to be customized by the user. That is individual users may select their desired types of information available via their dashboard.

Such features may include, but are not limited to, the following:
  Customer information updates from the dashboard.
  System alerts pertaining to all users
  Historical customer usage information and populate information to the user such as suggestions of available numbers
  Alerts announcing the upcoming availability of numbers that the customer has previously searched for
  Billing alerts and notification of payments made Overall, the online customer dashboard may provide a single starting point for any user working with toll free numbers. Having a single location may allow a user of the system to use a single user interface (the dashboard) to view the entirety of activity that is associated with a plurality of toll-free numbers.

The following are illustrative clauses demonstrating non-limiting embodiments of the inventions described herein:

A user device for presenting data to a user in real time regarding changes in metadata associated with a toll-free telecommunications number, the user device configured to:
  receive an indication of a change in status of a toll-free communications number, wherein the telecommunications number is associated with a responsible organization that processes toll-free telecommunications;
  update a metadatum associated with the toll-free communications number based at least in part on the change in status;
  store the metadatum;
  receive a status request from a user relating to the responsible organization;
  present the user with a graphic representation of the telecommunications number's status A method of toll-free telecommunications data visualization comprising:
  presenting a data visualization dashboard to a mobile application on a client device, wherein the presentation includes a selectable listing of toll-free telecommunications data parameters;
  receiving a selection from the client device of the toll-free telecommunications data parameters to analyze and at least one type of data analysis to perform;
  retrieving, in substantially real time, data relating to the selected toll-free telecommunications data parameters;
  analyzing the data according to the at least one type of data analysis; and
  presenting to the mobile application a summary of an analytic result.

In another disclosed non-limiting embodiment, the TFMP may provide a click-to-chat tool. The click-to-chat tool enables users to quickly contact a support representative through the user interface, dashboard, or other interface. The click-to-chat tool may integrate with existing web based access, provides an immediate channel to a support representative, and may facilitate support training.

In another disclosed non-limiting embodiment, the TFMP may provide a simplified two-factor authentication tool for maintaining identity and access security (e.g. dual factor authentication). This may eliminate the need to use hard tokens and improve VPN accessibility.

In another disclosed non-limiting embodiment, the TFMP may provide a password self-service tool that provides the ability for self-service passwords and unlock logon IDs. This may be automated via structured email processes.

In another disclosed non-limiting embodiment, the TFMP may provide a real-time status update tool that provides number counts and tasks within the application. This may facilitate a real-time view of number counts and status (i.e. reserved, assigned, etc.)

In another disclosed non-limiting embodiment, the TFMP may provide an integrated data stores & reporting tool that integrates data stores for consolidated reporting. This may facilitate the creation of a single operational data store to eliminate separate software as a service licenses and consolidated reporting for responsible organizations.

In another disclosed non-limiting embodiment, the TFMP may provide a single sign-on tool for Web Based Access (WBA), mechanized generic interface (API), Website/Billing, Web-based Reporting System (WRS), Virtual Private Networks (VPNs), IP Multimedia Subsystem (IMS), or some other network type.

In another disclosed non-limiting embodiment, the TFMP may provide an enhanced configurability tool that allows administrators to configure the limit of TFN that can be reserved in a single request, for example, more than 10. This may provide, for example, up to 5000 (would then do 500 batch calls).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art, such that any of the methods herein or any step may be completed instantaneously or near instantaneously. components. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program codes and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed:

1. A method of pre-populating a call routing template based on natural language inputs comprising:
   receiving a natural language input from a user, wherein the natural language input includes a natural language element having an association with a telecommunications routing code, the telecommunications routing code associated with decision tree logic associating routing of incoming calls to a telecommunications number;
   selecting the telecommunications routing code based at least in part on the association; populating information for the user, the information including a translation and mapping of natural language, existing user records and usage data;
   populating the telecommunications routing code at a node of a call routing decision tree to generate a populated call routing decision tree comprising a call routing template; and
   providing the user with a report comprising statistics describing a utilization of the call routing template.

2. The method of claim 1, wherein the natural language input is a text element.

3. The method of claim 2, wherein the text element is a scanned text element.

4. The method of claim 1, wherein the natural language input is a voice element.

5. The method of claim 4, wherein the voice element is obtained by voice recognition software.

6. The method of claim 1, wherein the decision tree logic determines a call path taken by an incoming call to a termination number.

7. The method of claim 1, wherein the decision tree logic determines a call path taken by an incoming call based at least in part on a time of day the incoming call is received.

8. The method of claim 1, wherein the decision tree logic determines a call path taken by an incoming call based at least in part on a geographic location of a device from which the incoming call is received.

9. The method of claim 1, wherein the decision tree logic determines a call path taken by an incoming call within a telecommunications system.

10. One or more non-transitory, computer-readable media comprising computer executable instructions that, when executed, cause at least one processor to perform actions comprising:
    receive a natural language input from a user, wherein the natural language input includes a natural language element having an association with a telecommunications routing code, the telecommunications routing code associated with decision tree logic associating routing of incoming calls to a telecommunications number;
    select the telecommunications routing code based at least in part on the association; populating information for the user, the information including a translation and mapping of natural language, existing user records and usage data;
    populate the telecommunications routing code at a node of a call routing decision tree to generate a populated call routing decision tree comprising a call routing template; and
    provide the user with a report comprising statistics describing a utilization of the call routing template.

11. The one or more non-transitory, computer-readable media of claim 10, wherein the natural language input is a text element.

12. The one or more non-transitory, computer-readable media of claim 11, wherein the text element is a scanned text element.

13. The one or more non-transitory, computer-readable media of claim 10, wherein the natural language input is a voice element.

14. The one or more non-transitory, computer-readable media of claim 13, wherein the voice element is obtained by voice recognition software.

15. The one or more non-transitory, computer-readable media of claim 10, wherein the decision tree logic determines a call path taken by an incoming call to a termination number.

16. The one or more non-transitory, computer-readable media of claim 10, wherein the decision tree logic determines a call path taken by an incoming call based at least in part on a time of day the incoming call is received.

17. The one or more non-transitory, computer-readable media of claim 10, wherein the decision tree logic determines a call path taken by an incoming call based at least in part on a geographic location of a device from which the incoming call is received.

18. The one or more non-transitory, computer-readable media of claim 10, wherein the decision tree logic determines a call path taken by an incoming call within a telecommunications system.

19. The one or more non-transitory, computer-readable media of claim 10, wherein the decision tree logic determines a call path taken by an incoming call based at least in part on a specified call volume threshold.

20. The one or more non-transitory, computer-readable media of claim 10, wherein the decision tree logic determines a call path taken by an incoming call based at least in part on a geographic location associated with a termination number.

\* \* \* \* \*

UNITED STATES PATENT AND TRADEMARK OFFICE
CERTIFICATE OF CORRECTION

PATENT NO. : 10,708,443 B2
APPLICATION NO. : 16/361604
DATED : July 7, 2020
INVENTOR(S) : Sharma et al.

Page 1 of 1

It is certified that error appears in the above-identified patent and that said Letters Patent is hereby corrected as shown below:

In the Drawings

On sheet 1 of 3, in Figure 1, and on the title page, the illustrative print figure, reference numeral 102, Line 1, delete "Resp Orgs" and insert -- RespOrgs --, therefor.

On sheet 1 of 3, in Figure 1, and on the title page, the illustrative print figure, reference numeral 124, Line 1, delete "Resp Orgs" and insert -- RespOrgs --, therefor.

In the Specification

In Column 3, Line 45, delete "[and" and insert -- and --, therefor.

In Column 5, Line 1, delete "TM-ST S-00798," and insert -- TM-STS-00798, --, therefor.

In Column 10, Line 50, delete "status" and insert -- status. --, therefor.

In Column 13, Line 28, after "instantaneously." delete "components.".

Signed and Sealed this
Eleventh Day of October, 2022

Katherine Kelly Vidal
*Director of the United States Patent and Trademark Office*